(No Model.) 3 Sheets—Sheet 1.

A. M. WHITE.
CLUTCH.

No. 489,280. Patented Jan. 3, 1893.

WITNESSES:
William Goebel.
Richard Lips.

INVENTOR
Albert M. White
BY George Cook.
ATTORNEY.

(No Model.)　　　　　　　A. M. WHITE.　　　　3 Sheets—Sheet 2.
CLUTCH.
No. 489,280.　　　　　　　　　　　　Patented Jan. 3, 1893.
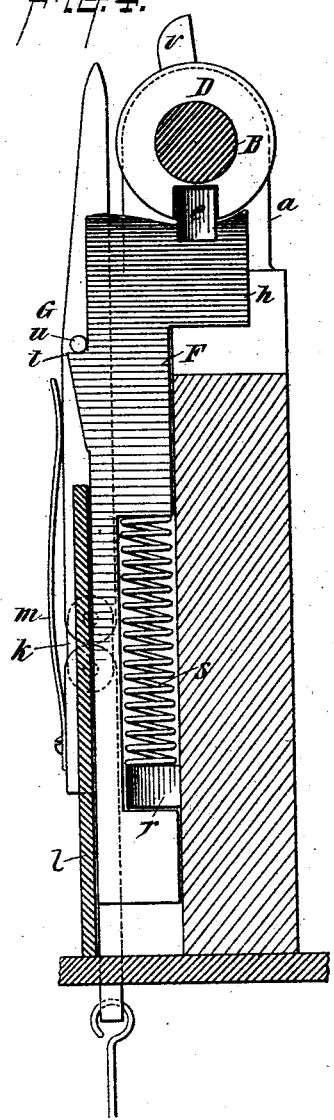
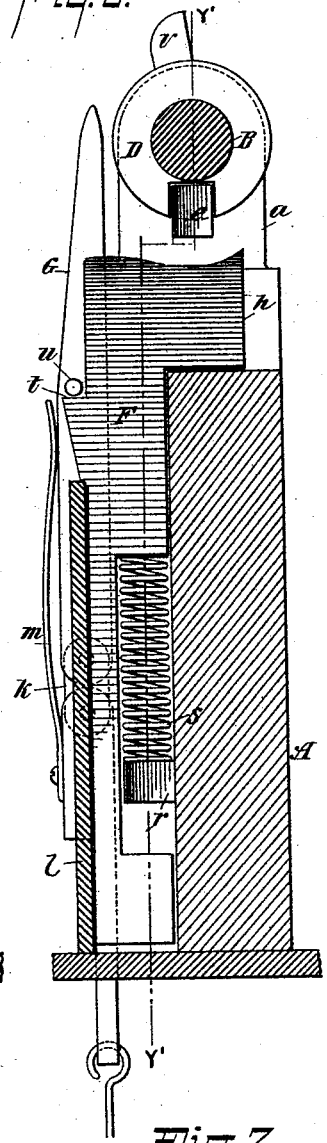
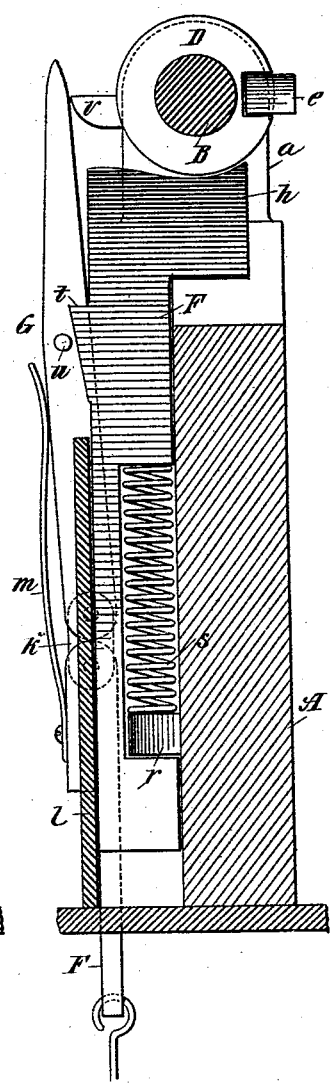
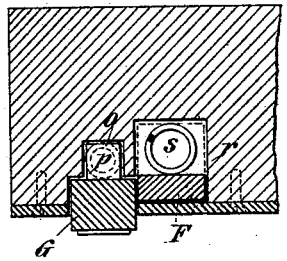
WITNESSES:
William Goebel
Richard Lips
INVENTOR
Albert M. White
BY George Cook
ATTORNEY.

(No Model.)  A. M. WHITE.  3 Sheets—Sheet 3.
CLUTCH.

No. 489,280.  Patented Jan. 3, 1893.

WITNESSES:
William Goebel.
Richard Lips.

INVENTOR
Albert M. White
BY George Cook.
ATTORNEY.

UNITED STATES PATENT OFFICE.

ALBERT M. WHITE, OF WATERBURY, CONNECTICUT.

CLUTCH.

SPECIFICATION forming part of Letters Patent No. 489,280, dated January 3, 1893.

Application filed February 1, 1892. Serial No. 419,948. (No model.)

*To all whom it may concern:*

Be it known that I, ALBERT M. WHITE, a citizen of the United States, and a resident of Waterbury, in the county of New Haven and State of Connecticut, have invented certain new and useful Improvements in Clutches, of which the following is a specification.

My invention relates to an improvement in clutches, the object of the same being to construct a device of this character which shall be simple, and which will operate to allow of but one revolution of the shaft for each manipulation of the operating lever, and with these ends in view my invention consists in certain novel features of construction and combinations of parts as will be hereinafter fully described and pointed out in the claims.

Figure 3:
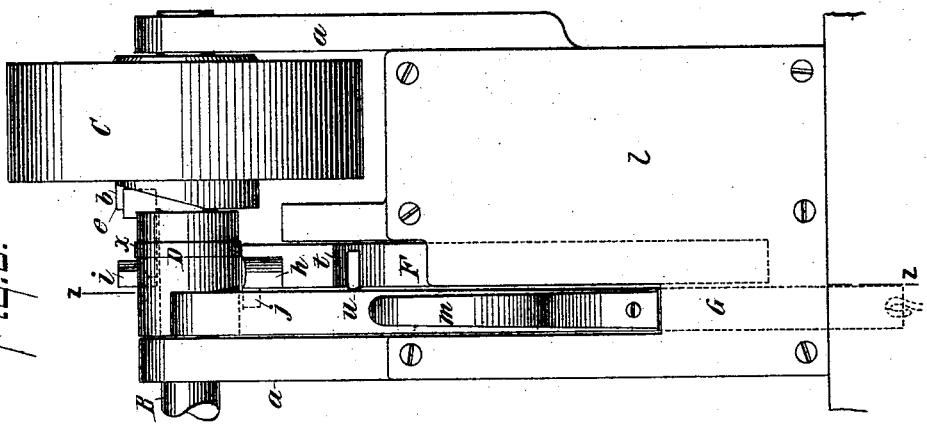
Figure 2:
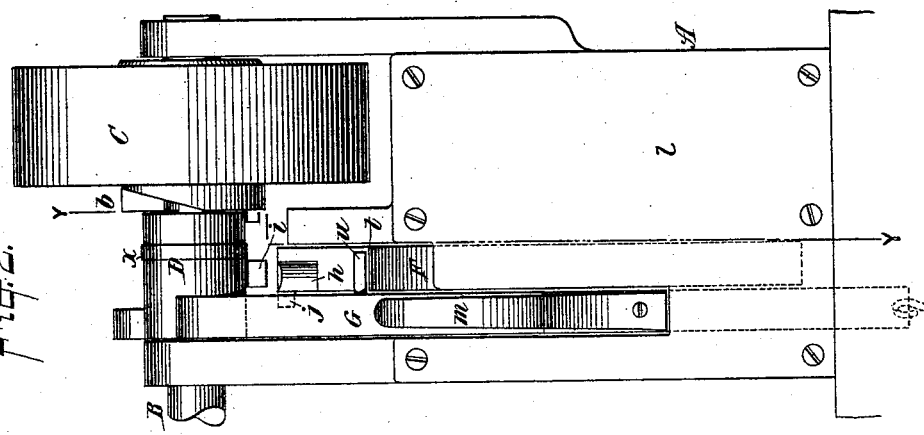
Figure 1:
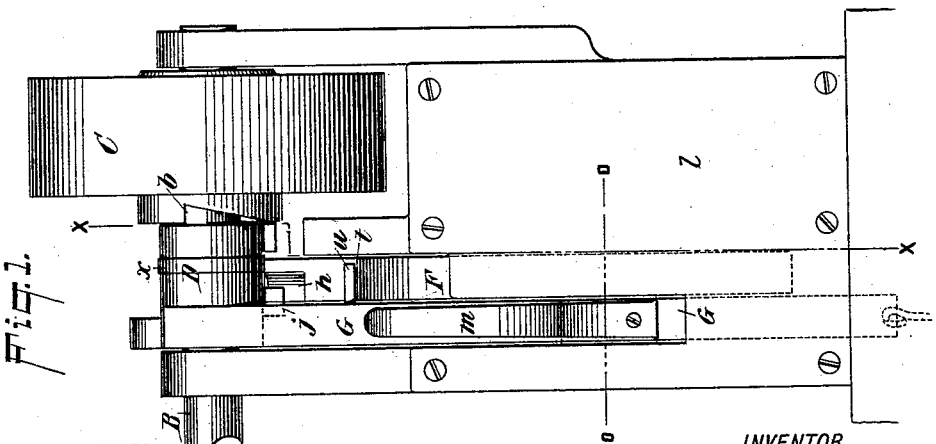
Figure 8:
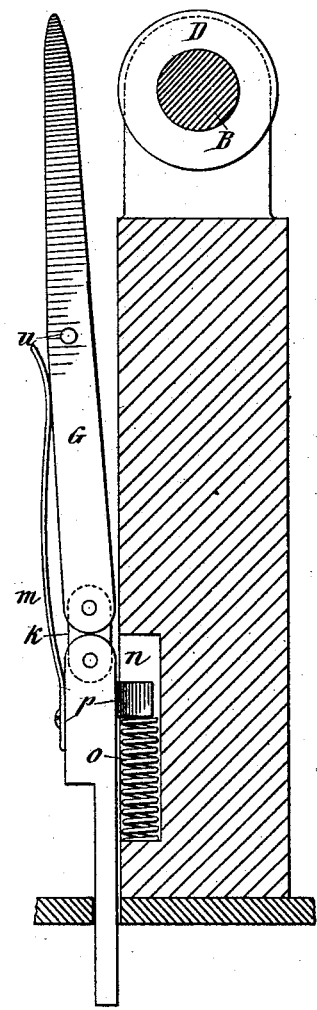
Figure 9:
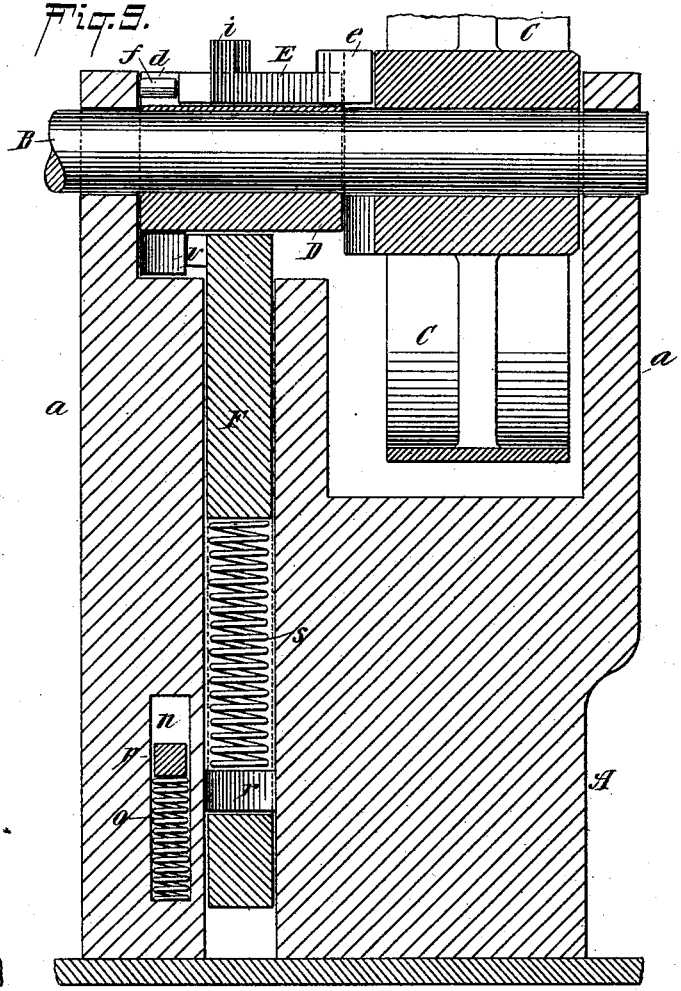
Figure 10:
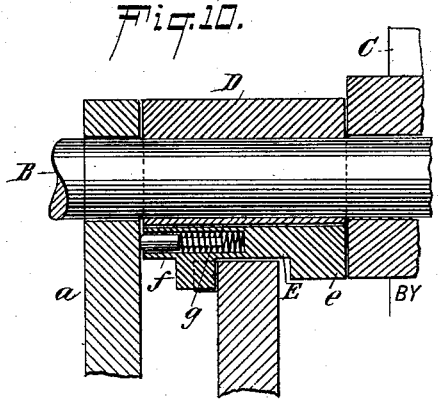

In the accompanying drawings:—Figure 1 is a front view of my improved clutch, the several parts being in position to prevent the shaft from revolving. Fig. 2 is a similar view showing the operating lever in its lowered position. Fig. 3 is a similar view showing the lever lowered and the cam raised. Fig. 4 is a sectional view taken on the line $x—x$ of Fig. 1. Fig. 5 is a sectional view taken on the line $y—y$ of Fig. 2. Fig. 6 is a similar view with the parts in a different adjustment. Fig. 7 is a sectional view taken on the line $o—o$ of Fig. 1. Fig. 8 is a sectional view taken on the line $z—z$ of Fig. 3. Fig. 9 is a sectional view taken on the line $y'—y'$ of Fig. 5. Fig. 10 is a similar view with the parts in a different adjustment.

A represents a frame work provided with the standards or uprights $a$ to serve as supports or bearings for the shaft B, on which latter is loosely mounted a pulley C, provided with the shoulders $b$.

To the shaft is keyed or otherwise tightly secured the collar D, grooved or recessed as at $d$ to contain the sliding rod E provided on its inner end with the enlargement $e$ to fit against the shoulders $b$, formed on the pulley C, to form a clutch and revolve the shaft when so engaged, said sliding rod E being retained within its groove by means of a band $x$ encircling said collar D. The rod E is hollowed out at one end as shown in Fig. 10 to contain the bar $f$, encircled by a small spring $g$, one end of which latter bears against the sliding rod E and the opposite end against the enlarged end of the rod $f$, the latter bearing against the standard $a$, the tendency of the spring $g$ therefore being to keep the rod E in engagement with the shoulders $b$ on the pulley C. The frame A is grooved to contain the vertically moving rod F, the upper end $h$ thereof being hollowed out to form and operate as a cam, and against which strikes the lug $i$ formed on the rod E, when the collar D is revolved, the effect of which is to withdraw the sliding rod E from engagement with the pulley C, the lug $i$ striking against the shoulder $j$ formed on the cam and bringing the shaft to a stop.

On the frame A slides the operating lever G, formed in two sections, and hinged as at $k$, Fig. 8, a face plate $l$ being secured to the frame A to hold the rods F, G in place and allow them to move vertically. To the lower section of the lever G is secured the spring $m$, the upper end of which bears against the upper section of said lever and tends to keep the same in a vertical line with said lower section, and against the frame A.

As shown in Figs. 8 and 9, the frame A is slightly hollowed out at $n$ to contain the spring $o$ on the top of which rests a projection $p$, formed on the lower section of the lever G, the tendency of the spring being to keep the said lever raised.

In order to keep the cam $h$ in its raised adjustment, the rod F is slightly cut away as shown in Figs. 5 and 6, a projection $r$, being formed on the frame A to extend into the same, and between which and the shoulder formed on the said rod F by cutting it away as described is inserted a spring $s$.

On the rod F is formed a shoulder $t$, on or against which bears the pin $u$, formed on or secured to the upper section of the lever G.

From the above description, it will be understood that when the lever G is lowered by the operator, the pin $u$ fitting on the shoulder $t$, will lower the rod F as shown in Figs. 2 and 5, whereupon the sliding rod E will by the action of the spring $g$ be forced into engagement with the pulley C, which by suitable belting, is kept constantly revolving. Through the intervention of this rod E and collar D, the shaft will be revolved until the lug $v$, formed on the collar D strikes the upper section of the lever G, forcing it outwardly as shown in Fig. 6, thereby forcing the pin $u$ out of engagement with the shoulder $t$, formed on the rod F. The spring $s$ at this instant raises the rod F and its cam $h$, into their original positions, whereupon the lug $i$, as the shaft and collar D revolve, will strike against said cam and riding against the beveled side thereof, will withdraw the sliding rod E from engagement with the pulley C and bring the shaft to a stop, as before described, at the end of every revolution. Upon releasing the lever G, the spring $o$ will raise it to its original position, again bringing said pin $u$ into engagement with the shoulder $t$, allowing the operation to be repeated. If the lever G is lowered to allow the sliding rod E to engage with the pulley C, and immediately thereafter released, the rods G, F will both be raised by their respective springs and the shaft revolved until the lug $i$, by striking on the cam $h$ withdraws the rod E from engagement with the pulley C as before described. It will thus be understood that the shaft will revolve but once for every manipulation of the operating lever G, it being necessary to each time lower the lever for each and every revolution of the shaft.

Having fully described my invention, what I claim as new and desire to secure by Letters Patent, is:—

1. A clutch constructed with a pulley C, a collar D, rod E, operating lever G and cam $h$, arranged to operate in the manner and for the purpose substantially described.

2. A clutch constructed with a pulley and shaft, a collar D provided with the lug $v$, a spring actuated, sectional, operating lever, rod F, formed with a cam $h$, and a sliding rod E, all of the above parts being constructed and arranged to operate in the manner and for the purpose substantially as described.

3. In a clutch, a combination with a shaft and pulley mounted thereon, of a collar D secured to the shaft and provided with the lug $v$, a rod E sliding in said collar, and adapted to engage with said pulley, a sectional spring actuated lever G, and a spring actuated rod F, formed on its upper end with the cam $h$ all arranged and constructed to operate in the manner substantially as described.

4. In a clutch the combination, with a clutch proper, of the sliding rod F, provided with a cam $h$ and shoulder $t$ sliding rod F to engage said clutch and cam, and a spring actuated sectional operating lever G, provided with a pin $u$, and adapted to lower said cam and release the same at each revolution of the clutch, substantially as described.

5. In a clutch, the combination with a shaft and pulley C, of a grooved collar D, a spring actuated rod E, sliding in said groove and adapted to engage with said pulley, a spring actuated rod F formed with the cam $h$, and shoulder $t$, and a spring actuated sectional lever G, provided with the pin $u$, all the above parts being constructed and arranged to operate in the manner and for the purpose substantially as described.

Signed at Waterbury, in the county of New Haven and State of Connecticut, this 28th day of January, A. D. 1892.

ALBERT M. WHITE.

Witnesses:
IRVING G. PLATT,
MARGUERITE G. BABIN.